United States Patent
Sugano et al.

(10) Patent No.: US 12,113,957 B2
(45) Date of Patent: Oct. 8, 2024

(54) PROGRAM, DEVICE, AND METHOD FOR GENERATING SIGNIFICANT VIDEO STREAM FROM ORIGINAL VIDEO STREAM

(71) Applicant: KDDI CORPORATION, Tokyo (JP)

(72) Inventors: Masaru Sugano, Tokyo (JP); Hiromasa Yanagihara, Tokyo (JP); Yasuyuki Nakajima, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 147 days.

(21) Appl. No.: 17/609,484

(22) PCT Filed: Feb. 12, 2020

(86) PCT No.: PCT/JP2020/005285
§ 371 (c)(1),
(2) Date: Nov. 8, 2021

(87) PCT Pub. No.: WO2020/230385
PCT Pub. Date: Nov. 19, 2020

(65) Prior Publication Data
US 2022/0321873 A1    Oct. 6, 2022

(30) Foreign Application Priority Data

May 15, 2019    (JP) ................... 2019-091895

(51) Int. Cl.
*H04N 19/103*    (2014.01)
*H04N 19/176*    (2014.01)
*H04N 19/177*    (2014.01)

(52) U.S. Cl.
CPC ......... *H04N 19/103* (2014.11); *H04N 19/176* (2014.11); *H04N 19/177* (2014.11)

(58) Field of Classification Search
None
See application file for complete search history.

(56) References Cited

U.S. PATENT DOCUMENTS

| | | | |
|---|---|---|---|
| 2009/0279738 A1 | 11/2009 | Sasaki | |
| 2010/0283589 A1* | 11/2010 | Kawai | H04N 19/63 382/284 |

(Continued)

FOREIGN PATENT DOCUMENTS

| | | |
|---|---|---|
| JP | 2003-189242 A | 7/2003 |
| JP | 2008-181324 A | 8/2008 |

(Continued)

OTHER PUBLICATIONS

Lee Sangkeun: "Video Analysis and Abstraction in the Compressed Domain", Jan. 1, 2003 (Jan. 1, 2003), pp. 1-153, XP093037052, Retrieved from the Internet: URL:https://smartech.gatech.edu/bitstream/handle/1853/5356/lee_sangkeun_200312phd.pdf?sequence=I (Year: 2003).*

(Continued)

*Primary Examiner* — Kaitlin A Retallick
(74) *Attorney, Agent, or Firm* — GREENBLUM & BERNSTEIN, P.L.C.

(57) ABSTRACT

A program for generating a significant video stream causes a computer to function as coding parameter extraction means for extracting a coding parameter of each macroblock for each frame from an original video stream, macroblock selection means for selecting a significant macroblock that has a coding parameter satisfying a predetermined condition, and significant video stream generation means for generating a significant video stream in which frames of the original video stream temporally synchronized with the frames of the coding parameter in the significant macroblocks are combined in time series.

17 Claims, 8 Drawing Sheets

(56) References Cited

U.S. PATENT DOCUMENTS

2015/0364158 A1* 12/2015 Gupte ................... H04N 5/77
　　　　　　　　　　　　　　　　　　　　386/223
2021/0160536 A1*  5/2021 Liu ..................... H04N 19/176

FOREIGN PATENT DOCUMENTS

| JP | 2009-271758 A | 11/2009 |
| JP | 2010-263500 A | 11/2010 |
| JP | 2013-218433 A | 10/2013 |
| JP | 2018-082333 A |  5/2018 |
| WO | 2003/045070 A1 |  5/2003 |
| WO | 2016/151978 A1 |  9/2016 |

OTHER PUBLICATIONS

Lee Sangkeun: "Video Analysis and Abstraction in the Compressed Domain", Jan. 1, 2003 (Jan. 1, 2003), pp. 1-153, XP093037052, Retrieved from the Internet: URL:https://smartech.gatech.edu/bitstream/handle/1853/5356/lee_sangkeun_200312phd.pdf?sequence=! (Year: 2003).*

Extended European Search Report, by the European Patent Office (EPO), dated Apr. 18, 2023, in European Patent Application No. 20806683.7.

Lee Sangkeun: "Video Analysis and Abstraction in the Compressed Domain", Jan. 1, 2003 (Jan. 1, 2003), pp. 1-153, XP093037052, Retrieved from the Internet: URL:https://smartech.gatech.edu/bitstream/handle/1853/5356/lee_sangkeun_200312_phd.pdf?sequence=1 [retrieved on Apr. 3, 2023].

International Search Report (including English Language Translation), mailed Apr. 7, 2020 by the Japan Patent Office (JPO), in International Application No. PCT/JP2020/005285.

* cited by examiner

PROGRAM, DEVICE, AND METHOD FOR GENERATING SIGNIFICANT VIDEO STREAM FROM ORIGINAL VIDEO STREAM

TECHNICAL FIELD

The present invention relates to a technique that generates a meaningful video stream with a reduced size from a video stream captured by a camera.

Priority is claimed on Japanese Patent Application No. 2019-91895, filed May 15, 2019, the content of which is incorporated herein by reference.

BACKGROUND ART

As a coding technique of a video stream, Moving Picture Experts Group (MPEG) is known. According to this technique, an "inter-frame prediction" system that, to increase compression efficiency for a video stream, generates a predicted image of a present frame based on a preceding and/or following frame and codes a difference (error) image of the input image and the predicted image is used.

The video stream may be a video stream captured by a video camera possessed by a user for home use or may be a video stream captured by a surveillance camera fixedly provided. In recent years, as equipment that generates a video stream, a dashcam that is mounted inside a vehicle for capturing an image of a front and/or rear views from a vehicle is known. The dashcam continues to store a video stream captured during driving of the vehicle.

FIG. 1 is a system configuration diagram having a terminal device as a dashcam provided in a vehicle.

As shown in FIG. 1, a terminal 1 as a dashcam captures a vehicle in a moving direction of the vehicle with a camera and stores a video stream in a storage unit (memory or disk). The terminal 1 transmits the video stream to a data center 2 through a wireless network.

The terminal 1 can also acquire driving information through a controller area network (CAN). The driving information may also be transmitted to the data center 2 along with the video stream.

The data center 2 may analyze the video stream and the driving information received from the terminal 1. For example, it is possible to detect and/or identify an object appeared in the video and to associate the driving information with the detected object or the identified object.

In the related art, a technique that encodes video data divided into a plurality of regions at a different coding rate for each region using a plurality of cameras provided in a vehicle is disclosed in, for example, Patent Document 1. According to the technique, a resolution required depending on a degree of importance is calculated for each region, and video data is encoded at a coding rate corresponding to the degree of importance.

A technique that, when a value of an acceleration of a vehicle in a specific direction exceeds a predetermined value, a dashcam provided in the vehicle outputs image data acquired by a plurality of cameras is disclosed in, for example, Patent Document 2.

A technique of a remote work support system that reduces an amount of data for video captured by a head-mounted camera on a worker is disclosed in, for example, Patent Document 3. According to the technique, evaluation is made whether or not there is a region having a large motion of an object in a video frame, and in a case where there is no region having a large motion, the region is regarded as unimportant and is deleted.

PRIOR ART DOCUMENTS

Patent Documents

[Patent Document 1]
Japanese Unexamined Patent Application, First Publication No. 2010-263500
[Patent Document 2]
Japanese Unexamined Patent Application, First Publication No. 2013-218433
[Patent Document 3]
Japanese Unexamined Patent Application, First Publication No. 2018-082333

SUMMARY OF INVENTION

Problems to be Solved by the Invention

According to the technique described in Patent Document 1, there is a need to identify a region in video data before encoding. In a case where the camera outputs video data already encoded, video data should be decompressed, and processing becomes complicated. While the coding rate is different for each region, since the video of all cameras is to be encoded, a reduction effect of overall data is small.

According to the technique described in Patent Document 2, since only the acceleration of the vehicle is applied as a determination factor of image data output, there is a problem where image data is not output in a driving state in which the acceleration of the vehicle is not changed.

According to the technique described in Patent Document 3, the magnitude of motion of an object in an image is evaluated and the image data is encoded. For this reason, there is a problem where it is not possible to evaluate a coding parameter of a macroblock for video data already encoded and to specify video data to be reduced.

In contrast, the inventors of the present application have considered that the capacity of data to be stored and/or transmitted could be reduced as long as a significant video stream including only a meaningful segment that will be needed for video analysis of an original video stream can be generated. The inventors have also considered that computational load could be reduced for detecting and/or identifying an object appeared in the significant video stream in a device receiving a significant video stream.

Accordingly, an object of the present invention is to provide a program, a device, and a method for generating a significant video stream including only a meaningful segment that will be needed for video analysis of an original video stream.

Means for Solving the Problems

According to the present invention, there is provided a program causing a computer to function as a device for generating a significant video stream from a captured and encoded original video stream. The program causing the computer to function as coding parameter extraction means for extracting a coding parameter of each macroblock for each frame from the original video stream, macroblock selection means for selecting the macroblock that has a coding parameter satisfying a predetermined condition, as a significant macroblock, and significant video stream generation means for generating a significant video stream in which a plurality of frames of the original video stream temporally synchronized with the frames of the coding parameters in the significant macroblocks are combined in time series.

It is preferable that the program of the present invention cause the significant video stream generation means to generate a video stream in which the frames of the coding parameters are combined in time series, as the significant video stream, in addition to the video stream in which the frames of the original video stream temporally synchronized with the frames of the coding parameter are combined in time series.

It is preferable that the program of the present invention cause the significant video stream generation means to include at least one of a frame number or a time code for each frame as the significant video stream.

It is preferable that the program of the present invention cause the significant video stream generation means to include significant macroblocks and distribution information of the significant macroblocks for each frame as the significant video stream.

It is preferable that the program of the present invention cause the significant video stream generation means to include a frame having a significant macroblock in a unit of group of pictures (GOP) as the significant video stream.

It is preferable that the program of the present invention cause the significant video stream generation means to delete a GOP not corresponding to a frame of a coding parameter in the significant macroblock or to encode the GOP not corresponding to the frame of the coding parameter in the significant macroblock at a high compression rate equal to or greater than a predetermined rate.

In the program of the present invention, it is preferable that the original video stream be output from a camera mounted in a moving object, and the significant video stream includes video in which only an object appearing or disappearing among objects captured by the camera is imaged.

In the program of the present invention, it is preferable that the encoding be performed based on Moving Picture Experts Group (MPEG), and the coding parameter includes a magnitude and a direction of a motion vector of forward prediction (inter), amount of coded data of intra prediction (intra), or the size of a quantization step.

It is preferable that the program of the present invention cause the macroblock selection means to function as the predetermined condition such that the motion vector of the forward prediction has a predetermined magnitude or larger and has a predetermined angle or larger with respect to a direction of a vanishing point, the amount of coded data of the intra prediction is equal to or greater than a first amount, or the quantization step size is equal to or greater than a predetermined size, for each macroblock to select a significant macroblock where temporal variation is greater than a predetermined amount or more.

It is preferable that the program of the present invention cause the significant video stream generation means to determine that the moving object is not in motion for a frame that the amount of coded data of the intra prediction is equal to or greater than a second amount, and exclude the frame from the significant video stream.

It is preferable that the program of the present invention cause the macroblock selection means to generate a coding parameter map in which the significant macroblocks are combined in a spatial direction corresponding to distribution information, and in the coding parameter map, as the coding parameter has a higher degree to satisfy the predetermined condition, a gradation of hue of a portion of the macroblock is displayed more darkly.

In the program of the present invention, it is preferable that the original video stream be encoded and the program cause the coding parameter extraction means to decompress the original video stream in a simplified manner to extract the coding parameter of each macroblock for each frame.

According to the present invention, a device for generating a meaningful video stream from a captured and encoded original video stream is provided. The device includes coding parameter extraction means for extracting a coding parameter of each macroblock for each frame from the original video stream, macroblock selection means for selecting the macroblock that has a coding parameter satisfying a predetermined condition, as a significant macroblock, and significant video stream generation means for generating a significant video stream in which a plurality of frames of the original video stream temporally synchronized with the frames of the coding parameters in the significant macroblocks are combined in time series.

According to the present invention, a method for generating a significant video stream from a captured and encoded original video stream is provided. The method includes a first step of extracting a coding parameter of each macroblock for each frame from the original video stream, a second step of selecting the macroblock that has a coding parameter satisfying a predetermined condition, as a significant macroblock, and a third step of generating a significant video stream in which a plurality of frames of the original video stream temporally synchronized with the frames of the coding parameters in the significant macroblocks are combined in time series.

Advantageous Effects of the Invention

According to the program, the device, and the method of the present invention, it is possible to generate a significant video stream including only a meaningful segment that will be needed for video analysis of an original video stream.

EMBODIMENTS FOR CARRYING OUT THE INVENTION

Figure 1:
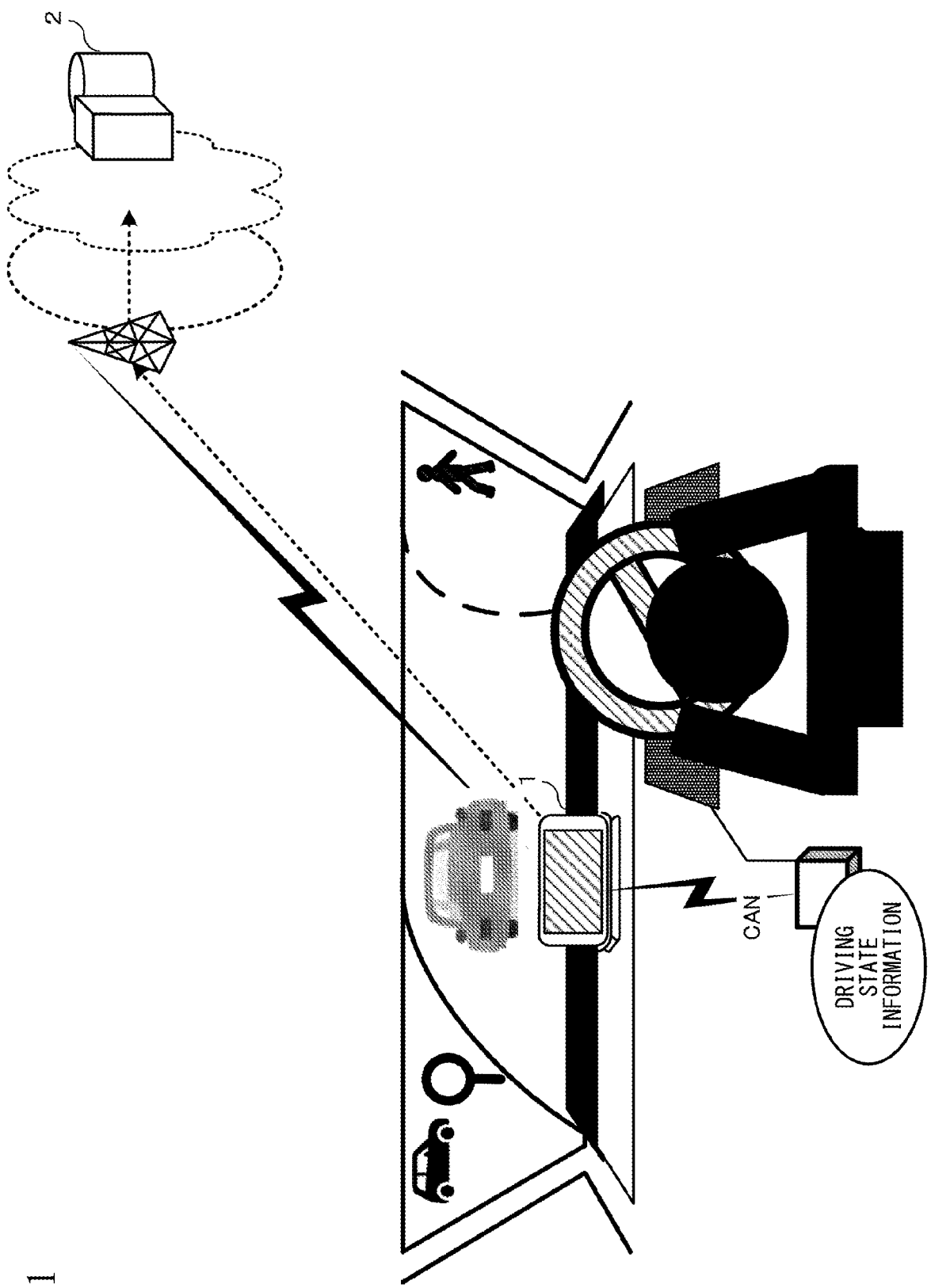
FIG. 1 is a diagram showing a system having a terminal as a dashcam provided in a vehicle.

Hereinafter, an embodiment of the present invention will be described in detail referring to the drawings.

According to the present invention, a "significant video stream" including only a meaningful segment that will be needed for video analysis can be generated from an "original video stream".

The "original video stream" is captured from a camera mounted in, for example, a moving object, such as a vehicle, and is an encoded video stream.

The "significant video stream" is an encoded sequence of video frames that include only video needed for, for example, object detection or object recognition or for analyzing a driving state (speed and/or acceleration) or the like in the moving object.

In general, the significant video stream is a video frame in which only surrounding objects suddenly appearing or disappearing among surrounding objects viewed from the camera are appeared. Obviously, the present invention is not limited thereto.

Accordingly, the significant video stream is an encoded sequence of video frames in which the capacity of a video stream to be transmitted or stored is reduced with respect to the original video stream.

Figure 2:
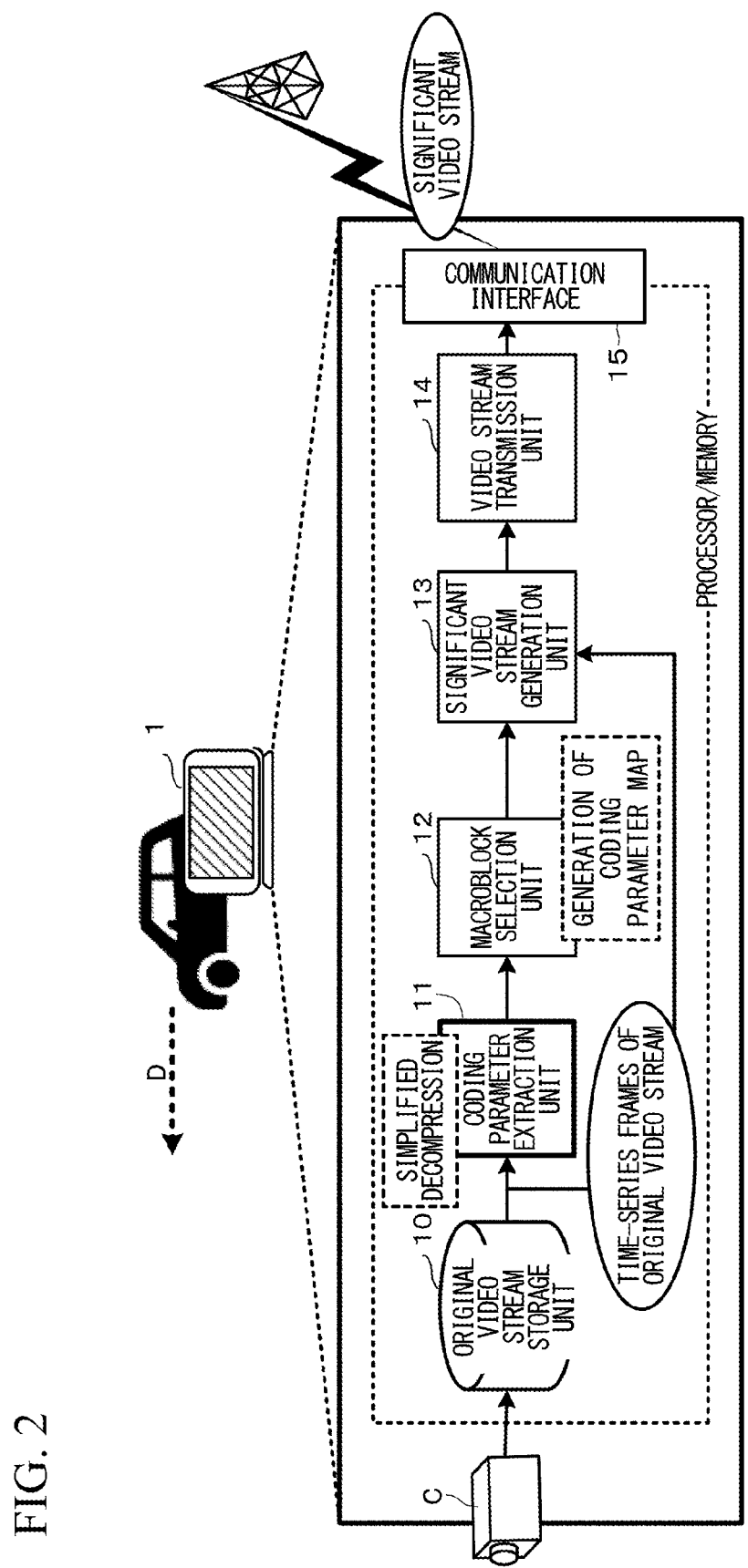
FIG. 2 is a block diagram showing a terminal in an embodiment of the present invention.

FIG. 2 is a functional configuration diagram of a terminal in the present invention.

According to the embodiment of the present invention, a terminal 1 is a dashcam mounted with a camera C and is provided inside a vehicle. An imaging direction D of the camera C is not limited to frontward of the vehicle in a moving direction, and may be rearward or sideward.

The terminal 1 can perform communication with the data center 2 through any wireless network. The data center 2 has a function of analyzing video from the significant video stream. Obviously, the present invention is not limited to the data center, and an edge computing device may be applied.

Referring to FIG. 2, the terminal 1 has the camera C, an original video stream storage unit 10, a coding parameter extraction unit 11, a macroblock selection unit 12, a significant video stream generation unit 13, a video stream transmission unit 14, and a communication interface 15. A computer (processor) mounted in the device is made to function by executing a program stored in a memory, whereby the functional configuration units excluding the camera C are realized. A flow of processing of the functional configuration units can be considered as a significant video stream generation method of the device.

Referring to FIG. 2, the camera C captures video in the imaging direction D and outputs an original video stream. The original video stream may be a video stream encoded in the camera C. In a case where camera C outputs uncompressed video data, the uncompressed video data may be encoded by a device or software other than the camera C.

A coding system may be a standard format, such as H.264 or H.265 based on MPEG, or may be a non-standard format. A spatial resolution or a temporal resolution (frame rate) and a coding rate (bit rate) may be arbitrary.

[Original Video Stream Storage Unit 10]

The original video stream storage unit 10 temporarily stores the original video stream captured by the camera C. The original video stream is encoded by, for example, MPEG.

The original video stream storage unit 10 outputs the original video stream to the coding parameter extraction unit 11 at any timing.

[Coding Parameter Extraction Unit 11]

The coding parameter extraction unit 11 decompresses (decodes) the coded original video stream in a simplified manner and interprets (parses) a bit stream. The simplified decompression herein merely extracts a coding parameter from the coded original video stream. That is, the original video stream is not completely decompressed and is not reproduced to a visual video frame. For example, in a case where the coding parameter is expressed by a difference, the coding parameter may be merely for restored to an original value, and a state in which the coding parameter can be processed may be brought.

Figure 3:
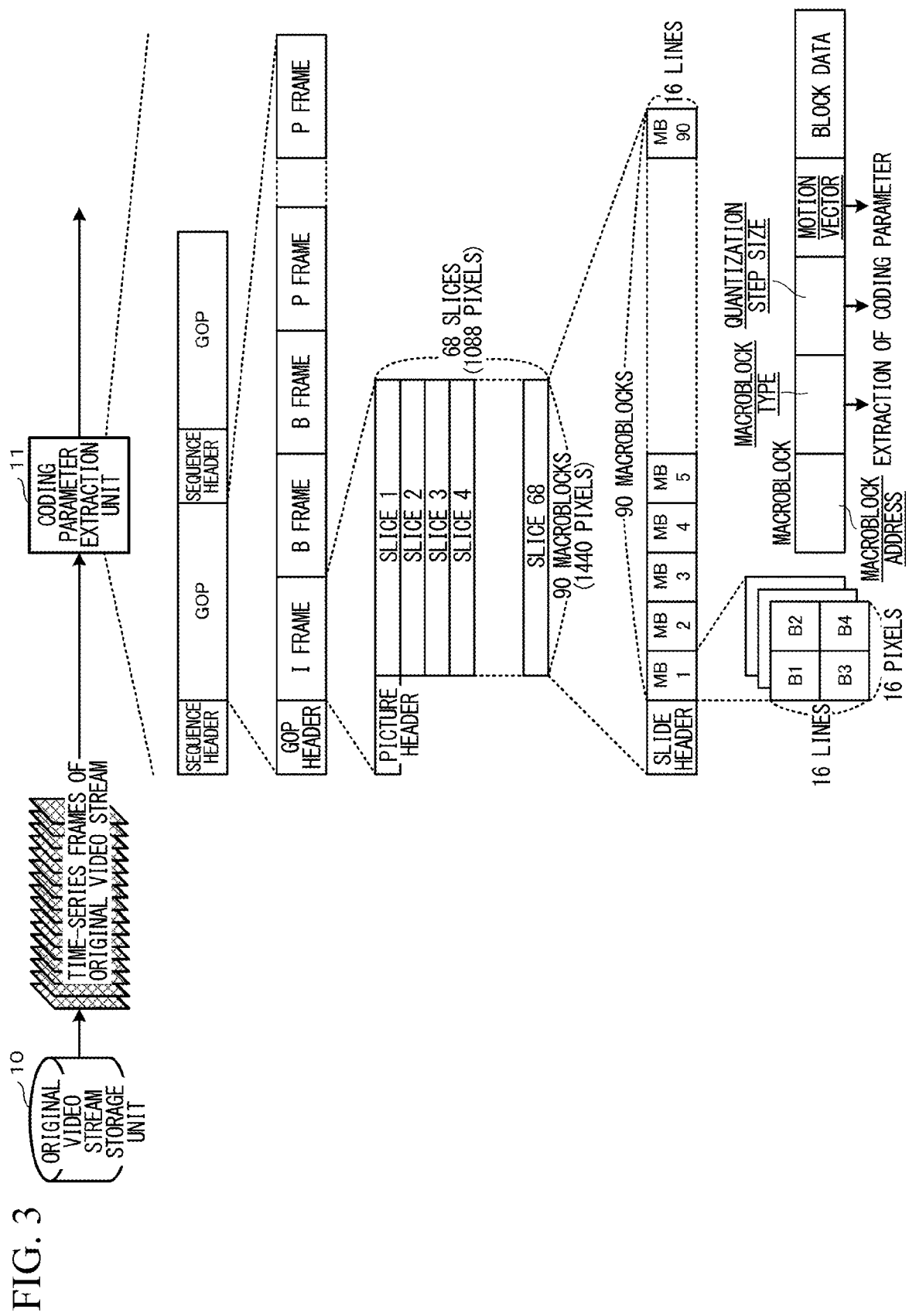
FIG. 3 is an explanatory view showing a coding parameter extraction unit in the terminal of the embodiment of the present invention.

FIG. 3 is a diagram illustrating the operation of the coding parameter extraction unit 11 in the terminal 1 of the embodiment.

As shown in FIG. 3, the coded original video stream is configured with a sequence header and group of pictures (GOP) data.

In the sequence header, the number of vertical and horizontal pixels of the frame, and the like are described.

The GOP data is configured of a GOP header and a plurality of pieces of picture data (I, P, and B picture data) having a series of orders. The GOP header includes a time code representing a time of an initially presented screen of the group, or the like. The picture data represents one frame (image).

The picture data includes a picture header and slice data (slice 1 to slice 68).

As shown in FIG. 3, one piece of picture data includes vertical 1088 pixels (68 line slices)×horizontal 1440 pixels (90 macroblocks). A slice is formed by partitioning one picture in a band shape.

Each slice includes a slice header and 90 pieces of macroblock data (MB1 to MB90).

Each macroblock is a square pixel block of 16 pixels×16 lines.

In each macroblock, a macroblock address, a macroblock type, a quantization step size, a motion vector, and block data are included. Of course, the configuration of the original video stream is not limited thereto, and any configuration may be applied depending on the number of vertical and horizontal pixels of picture data, the number of slices, or the size of the macroblock.

The coding parameter extraction unit 11 extracts a coding parameter of each macroblock for each frame from the original video stream.

The coding parameter is any of the followings.
(1) Magnitude and direction of motion vector of forward prediction (inter)
(2) Amount of coded data with intra prediction (intra) block type
(3) Size of quantization step

[Macroblock Selection Unit 12]

The macroblock selection unit 12 selects a macroblock that has a coding parameter satisfying a predetermined condition, as a significant macroblock. Here, the "predetermined condition" is a condition that temporal variation is greater than a predetermined amount or more. For each macroblock, for example, selection is made under any predetermined condition of <1>, <2>, and <3> described below.

<1> a motion vector of forward prediction has a predetermined magnitude or larger, and has a predetermined angle or larger with respect to a direction of a vanishing point <2> an amount of coded data of intra prediction is equal to or greater than a first amount <3> a quantization step size is equal to or greater than a predetermined size The macroblock selection unit 12 extracts a region where there is relatively sudden change. The "sudden change" includes a case where a surrounding object viewed from the camera is changed suddenly and a case where a driving state of a moving object (for example, a vehicle) mounted with the camera is changed suddenly.

<1. Selection of Macroblock Based on Motion Vector of Forward Prediction>

Figure 4A:
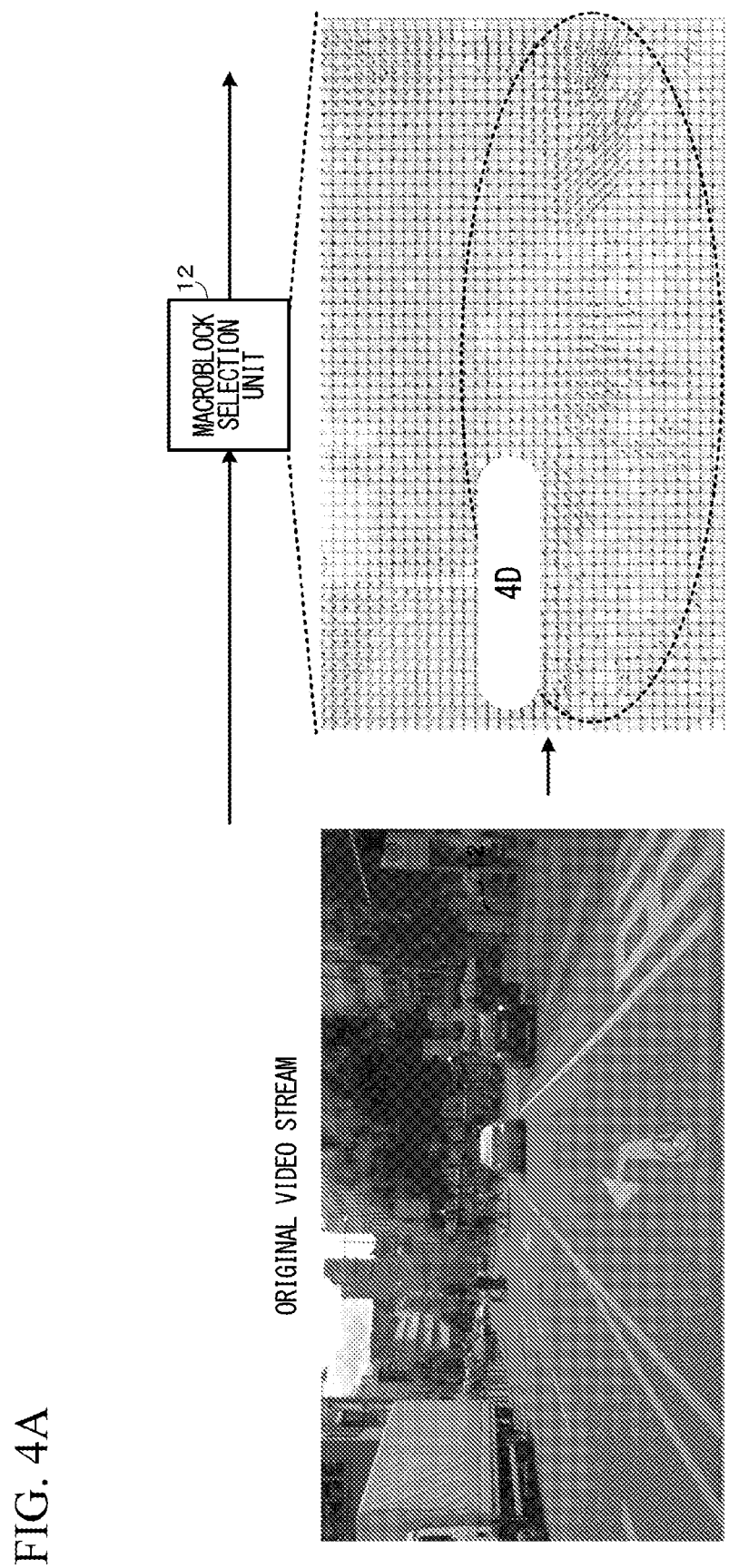
FIG. 4A is a diagram showing a motion vector of each macroblock in a case where an object that appears in an original video is changed at a given speed in the embodiment of the present invention.
Figure 4B:
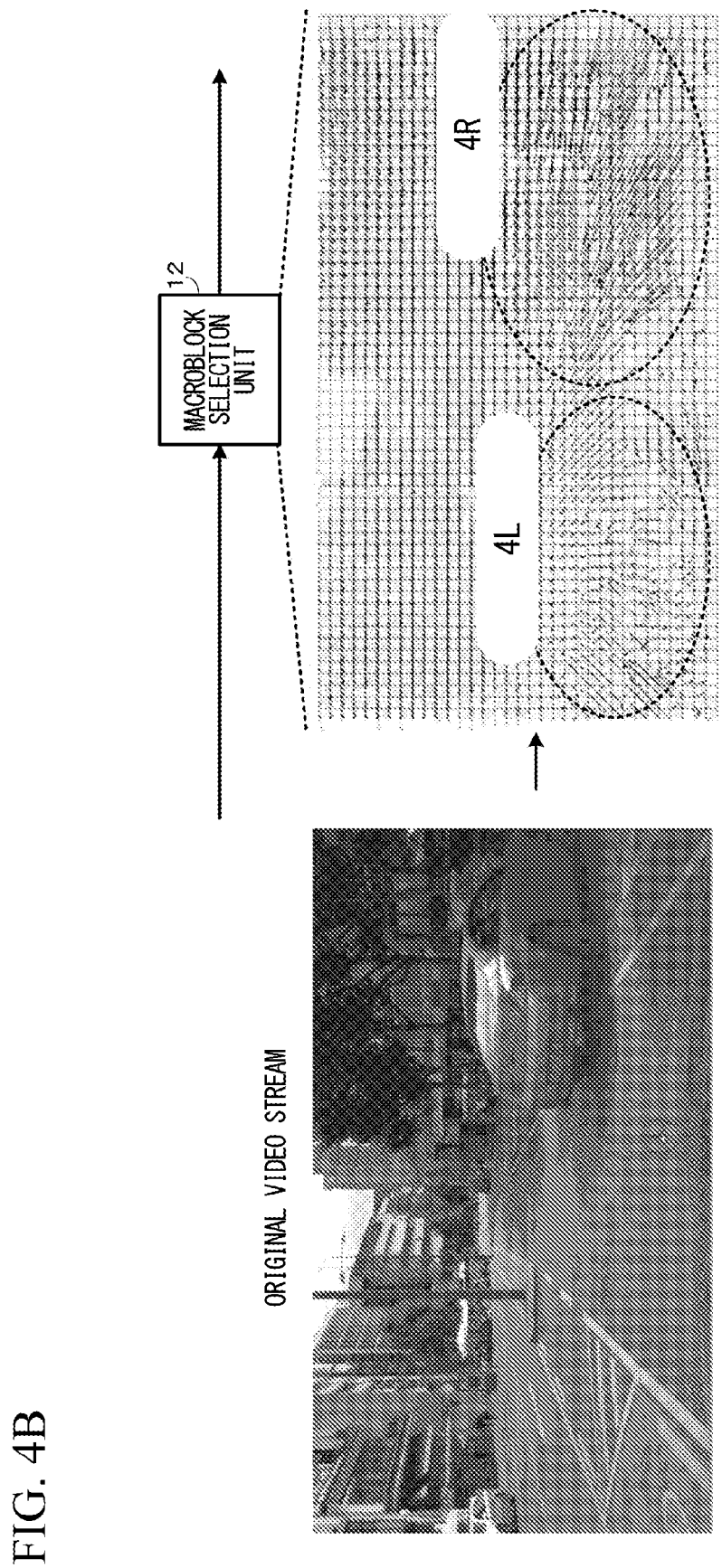
FIG. 4B is a diagram showing a motion vector of each macroblock in a case where an object that appears in an original video is suddenly changed in the embodiment of the present invention.

FIGS. 4A and 4B are explanatory views representing a motion vector of each macroblock.

FIG. 4A represents a case where an object appeared in an original video is changed at a given speed.

FIG. 4B represents a case where an object appeared in an original video is changed suddenly.

In each of FIGS. 4A and 4B, an image frame of the original video stream and a motion vector of each macroblock are represented.

Referring to FIG. 4A, in a dotted-line elliptical region 4D, a motion vector of an object is directed in the same direction as a motion direction of a vehicle. In FIG. 4A, the following distribution of the motion vectors is observed.

The direction of the motion vector is directed in a direction of a vanishing point and has small temporal change.

The size of the motion vector is smaller as the motion vector is closer to the vanishing point and is greater as the motion vector is farther from the vanishing point.

For example, in a case where a preceding vehicle with respect to own vehicle is driving at a given speed, a coding parameter of the region 4D where the preceding vehicle is appeared does not satisfy the above-described "predetermined condition". Accordingly, a significant macroblock is not selected from FIG. 4A.

Referring to FIG. 4B, in a region 4L, a motion vector of an object is directed in the same direction as the motion direction of the vehicle. On the other hand, in a region 4R, a motion vector of an object is directed in a different direction from the motion direction of the vehicle. In the region 4R of FIG. 4B, the following distribution of the motion vectors is observed.

the direction of the motion vector is directed in a different direction from the vanishing point, and has large temporal change.

the size of the motion vector is large regardless of the distance from the vanishing point For example, as shown in the region 4R, in a case where a preceding vehicle with respect to the host vehicle changes lanes or decelerates suddenly, a coding parameter of a region where the preceding vehicle is appeared is detected as a coding parameter satisfying the above-described "predetermined condition". Accordingly, a significant macroblock is selected from the region 4R of FIG. 4B.

With the use of this characteristic, a region where there is sudden change in the original video stream can be estimated as a significant macroblock.

As another embodiment, for example, it is preferable that a selection criterion (predetermined condition) of the magnitude of the motion vector is adaptively changed corresponding to the following cases (a), (b), and (c).

(a) a case where a motion vector is calculated with reference to one frame located at two or more frames before (b) a case where a motion vector is calculated with reference to one previous frame (c) a case where a plurality of frames are referred Here, in the case (a), the magnitude of a motion vector when one frame located at two frames before is referred is about two times greater than the magnitude of a motion vector in the case (b).

The size of a motion vector encoded at 30 frames per second is about ⅓ of the magnitude of a motion vector encoded at 10 frames per second.

For this reason, the determination of the predetermined condition is adaptively changed corresponding to a comparative measure.

<2. Selection of Macroblock Based on Code Amount of Intra Prediction>

The amount of coded data of an intra-predicted macroblock is large in a case where there is an edge (the contour of an object) in the image and is small in a case where a region is flat.

That is, in a case of FIG. 4A, since a road region is flat, a large number of macroblocks of intra prediction with a small amount of coded data are observed. On the other hand, in a case of FIG. 4B, a large number of macroblocks of intra prediction with a large amount of coded data are observed in an edge region of the vehicle that intends to turn right in the region 4R.

With the use of this characteristic, a region where an object is present in the original video can be estimated as a significant macroblock.

<3. Selection of Macroblock Based on Number of Intra-Predicted Macroblocks>

The number of intra-predicted macroblocks is large in a case where a sudden change occurs in the image and is small in a case where there is little change.

That is, in a case of an original video stream on a left side of FIG. 6 described below, since there is little change in the image, a small number of intra-predicted macroblocks are observed. On the other hand, in a case of an original video stream on a right side of FIG. 6, since an image of a vehicle appears newly, a large number of macroblocks of intra prediction are observed.

With the use of this characteristic, a region where there is sudden change in the original video can be estimated as a significant macroblock.

<4. Selection of Macroblock Based on Quantization Step Size>

According to an adaptive quantization system, a quantization step size of a macroblock is adaptively changed to increase compression efficiency. In regard to an original video stream, since human vision is sensitive in a region where there is little change, the quantization step size is set small. On the other hand, since human vision is insensitive in a region where there is sharp change, the quantization step size is set large.

That is, in a case of FIG. 4A, a large number of macroblocks of a small quantization step size are observed. On the other hand, a large number of macroblocks of a large quantization step size are observed in a wheel region of the preceding vehicle on the right side of FIG. 4B.

With the use of this characteristic, a region where there is sudden change in the original video can be estimated as a significant macroblock.

As another embodiment, the macroblock selection unit 12 may generate a "coding parameter map" in which significant macroblocks are combined in a spatial direction corresponding to on distribution information.

Figure 5:
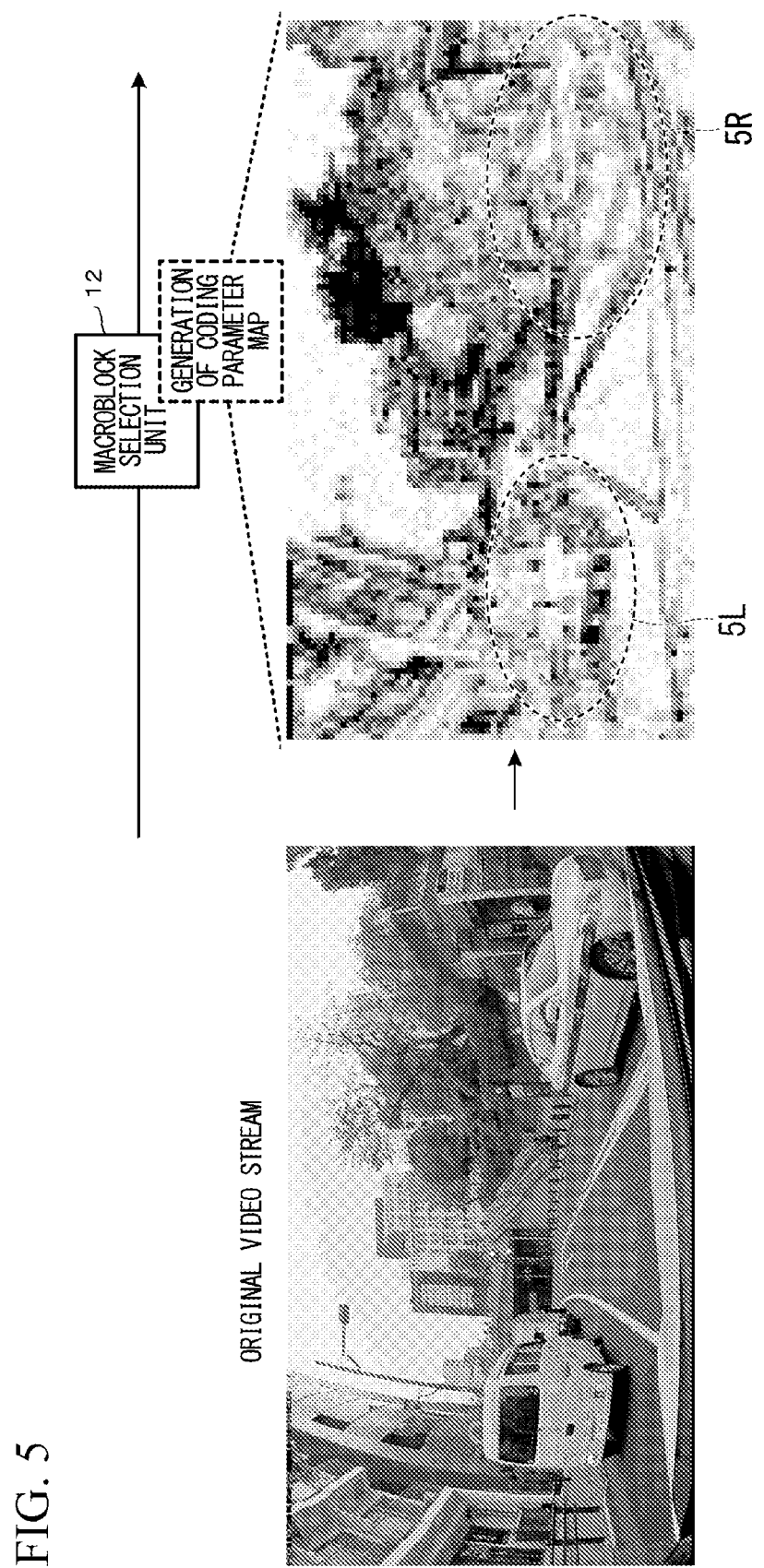
FIG. 5 is a diagram showing a coding parameter map in the embodiment of the present invention.

FIG. 5 is a diagram showing a coding parameter map in the embodiment of the present invention.

In the "coding parameter map", as a coding parameter has a higher degree to satisfy the predetermined condition, the hue gradation of a portion of the macroblock may be displayed more darkly.

In this way, in the coding parameter map, for example, a distribution of macroblocks can be displayed in a color of a gradation corresponding to the magnitude and direction of the motion vector, the amount of coded data, or the quantization step size of the macroblock.

(1) For example, as the magnitude of a motion vector of the forward prediction is greater and as displacement from the direction toward the vanishing point is larger, a color of a deeper gradation is displayed in the distribution of the macroblock.

(2) For example, as the amount of coded data with intra prediction is greater (a macroblock has a coding mode of intra prediction), a color of a deeper gradation is displayed in the distribution of the macroblock.

(3) For example, as the quantization step size of a macroblock is smaller, a color of a deeper gradation is displayed in the distribution of the macroblock.

As shown in the coding parameter map of FIG. 5, in a region 5L where change occurs at a given speed and there is little change, the amount of coded data with intra prediction is small. On the other hand, in a region 5R where there is sudden change, the amount of coded data with intra prediction is large.

As another embodiment, it is preferable that a region where there is no temporal variation in frames is excluded from an extraction target of a coding parameter.

Figure 6:
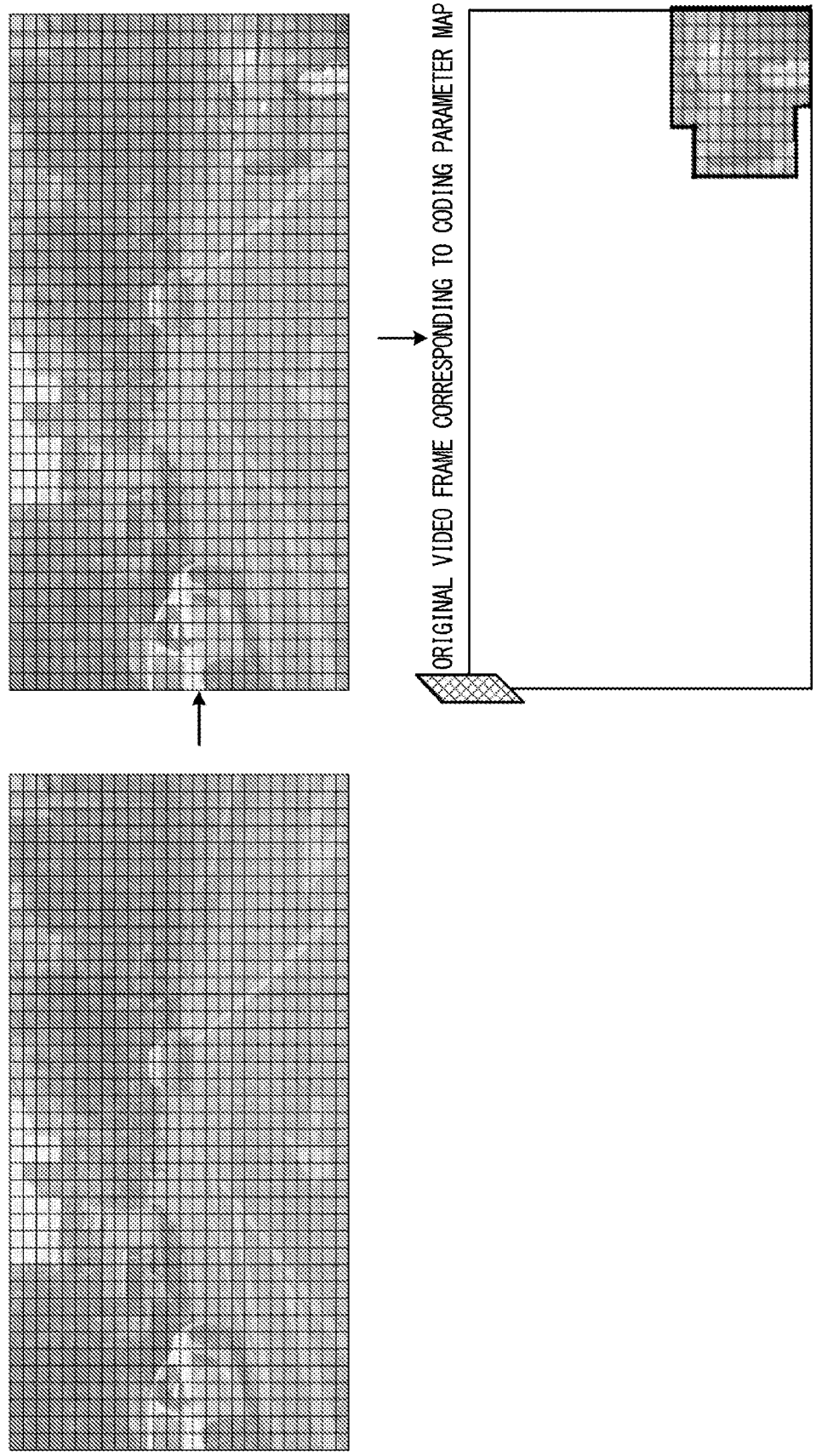
FIG. 6 is a diagram showing an example where only a distribution of macroblocks that satisfy a predetermined condition is generated as a coding parameter map in the embodiment of the present invention.

FIG. 6 is a diagram illustrating a case where only a distribution of a macroblock satisfying the predetermined condition is generated as a coding parameter map.

As shown in a lower right view of FIG. 6, in regard to an original video stream, only a region where there is sudden change is extracted. Since the coding parameter map does not include macroblocks not satisfying the predetermined condition, the whole amount of data can be significantly reduced.

There is a case where a region, such as a dashboard, is included in an original video captured by the camera, for example, depending on the location where the dashcam is equipped in the vehicle. In a case where such a region is fixed in advance, the region may be masked corresponding to setting at the time of factory shipment. Of course, the user may set a region to be masked using a graphic user interface (GUI).

In a case where a region having no temporal variation in frames is, for example, flat, a "skip mode" may be selected as a coding mode of a macroblock. Such a region may be excluded from an extraction target of a coding parameter. For example, the region of the dashboard in the original video is flat, and the "skip mode" is selected as a coding mode of the macroblock, whereby the amount of coded data with intra prediction is also small.

In this way, in regard to each macroblock, a variation situation is observed at a predetermined time period, and in a case where the amount of coded data of the intra-predicted block is apparently smaller than other regions in the frame or an appearance frequency of a block in a skip mode is high, it is effective to delete the region.

[Significant Video Stream Generation Unit 13]

Figure 7:
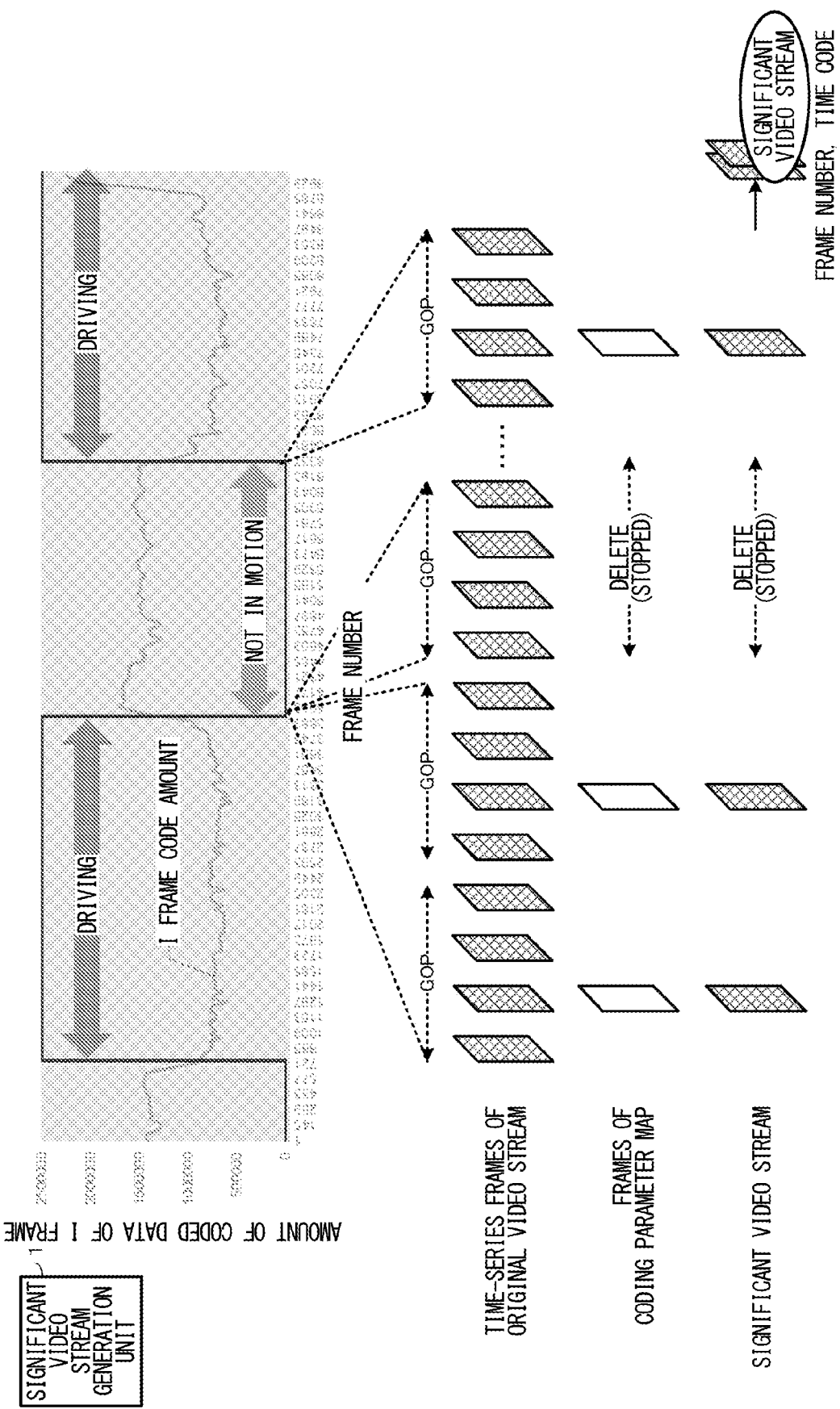
FIG. 7 is a diagram showing an operation of a significant video stream generation unit in the terminal of the embodiment of the present invention.

The significant video stream generation unit 13 generates a meaningful video stream in which a plurality of frames of an original video stream temporally synchronized with frames of coding parameters in significant macroblocks are combined in time series (see FIG. 7).

The significant video stream generation unit 13 may combine the frames of the coding parameters in time series in addition to combining the frames of the original video stream synchronized with the frames of the coding parameters in time series.

As shown in FIG. 4A, 4B, or 5, "frames of coding parameters" refer to frames where coding parameters are distributed in association with the distribution of macroblocks. That is, "frames of coding parameters" are frames to which the coding parameters extracted by the coding parameter extraction unit 11 are mapped.

"Frames of an original video stream synchronized with frames of coding parameters" literally use the frames of the original video stream.

In regard to the original video stream, only frames where there is sudden change can be selected depending on the amount of coded data of each frame.

(1) For example, in regard to the original video stream, in a case where change occurs at a given speed and there is no steep change, motion is present in the frame, and macroblocks of forward prediction are dominant. Accordingly, macroblocks of intra prediction become less dominant, and the amount of coded data in the whole frame tends to decrease. For example, in a case of an original video stream in which peripheral vehicles during driving at a given speed are captured from the camera of the host vehicle, the amount of coded data in the whole frame decreases.

For example, in H.264 where coding is performed at a constant bit rate of about 6 Mbits per second, the amount of coded data of an I (intra) frame in an original video stream during driving may range between 500 Kbit to 800 Kbits.

(2) On the other hand, in regard to an original video stream, in a case where there is sudden change, macroblocks of intra prediction are dominant. Accordingly, macroblocks of forward prediction become less dominant, and the amount of coded data in the whole frame tends to increase. For example, in a case of an original video stream in which peripheral vehicles with sudden change are captured from the camera of the host vehicle, the amount of coded data in the whole frame increases.

(3) In regard to an original video stream, in a case where motion is not present in the frame (for example, peripheral vehicles are not in motion), macroblocks of forward prediction become less dominant, while macroblocks of intra prediction are dominant, and the amount of coded data in the whole frame tends to increase. For example, in regard to an original video stream in which peripheral vehicles are not in motion and there is no change, the amount of coded data of the I (intra) frame may be equal to or greater than 1 Mbits.

In this case, a threshold value is set to 1 Mbits for the amount of coded data in the intra-coded frame, whereby a situation of driving/stop can be determined.

In this way, sudden change or the like of a driving situation can be estimated by observing the amount of coded data of the frame (see FIG. 7 described below).

As another embodiment, the sudden change of the driving situation may be estimated by counting the number of macroblocks with intra prediction mode in each frame without observing the amount of coded data in each frame. For a frame where the number of macroblocks of intra prediction is equal to or greater than a predetermined number, determination can be made that there is sudden change in an object captured in the frame.

For example, in a case where a vehicle enters or exits a tunnel or in a case where a view is degraded suddenly due to heavy rain or smoke, in regard to an original video stream captured by the dashcam, a most region of a frame tends to consist of macroblocks with intra prediction.

FIG. 7 is a diagram showing the operation of the significant video stream generation unit 13 in the terminal according to the embodiment of the present invention.

<Selection of Frame Based on Code Amount>

The significant video stream generation unit 13 determines that a moving object being imaged is not in motion for a frame where the amount of coded data of the I (intra) frame is equal to or greater than a second amount of coded data (for example, 1 Mbits), and excludes the frame from a significant video stream.

With this, it is possible to reduce the number of frames within a significant video stream.

In this case, it is preferable that the second amount of coded data to be a threshold value for the above-described determination is set to different values between a case of coding for constant bit rate (CBR) and a case of coding for variable bit rate (VBR). There is a need to change a criterion, such as whether an absolute amount of coded data should be evaluated or evaluation is made with a difference in relative amount of coded data from another predictive coded frame. In this way, it is preferable to adaptively control the second amount of coded data in consideration of a difference in structure of an original video stream, or the like.

As another embodiment, in regard to a frame that should be excluded from the time-series frames of the original video stream, the frame itself may not be excluded, and only a compression rate (coding bit rate) may be increased. That is, at least a frame having a significant macroblock may be sufficiently reproduced.

The significant video stream generation unit 13 includes a frame number and/or a time code for each frame as a significant video stream.

It is preferable that the significant video stream generation unit 13 includes significant macroblocks and distribution information of the significant macroblocks for each frame as a significant video stream. With this, a significant region of each frame in the significant video stream can be specified. That is, macroblocks in a meaningless region can be reduced.

The data center 2 that receives a significant video stream can reproduce the significant video stream by receiving the frame number, the time code, and the distribution information of the macroblocks along with the significant video stream.

As another embodiment, it is preferable that the significant video stream generation unit 13 includes a frame having a significant macroblock in a unit of group of pictures (GOP) as a significant video stream. With this, a group of video frames to be transmitted can be put together.

A GOP not corresponding to the frame of the coding parameter in the significant macroblock can be deleted or can be compressed at a compression rate equal to or higher than a predetermined rate.

As another embodiment, the significant video stream generation unit 13 may include a user interface in which observation start and end are designated. Frames in a segment during which a vehicle is not in motion or the whole image is not varied can be excluded from a significant video stream.

[Video Stream Transmission Unit 14]

The video stream transmission unit 14 transmits the significant video stream output from the significant video stream generation unit 13 to the data center 2 through the communication interface 15.

The significant video stream is transmitted at any timing. For example, the significant video stream may be transmitted when output from the significant video stream generation unit 13 or may be temporarily buffered and transmitted when a predetermined capacity is fulfilled.

In a case where the significant video stream includes the frames of the coding parameters, an original video stream including original video frames corresponding to the frames of the coding parameters may be transmitted simultaneously or separately.

The frame number and/or the time code, the significant macroblocks, and the distribution information of the macroblocks may be transmitted along with the significant video stream synchronously or asynchronously. With this, the data center can reproduce the significant macroblocks from the significant video stream.

As another embodiment, it is preferable that the video stream transmission unit 14 transmits driving state information with a time code along with the significant video stream. The coding parameters and the driving state information can be associated based on the time code. In this case, it is preferable to associate the coding parameters and the driving state information at a predetermined time width of the time code.

As described above in detail, with the program, the device, and the method of the present invention, it is possible to generate a significant video stream including only significant segments that will be needed for video analysis of an original video stream.

With this, only meaningful video frames and video regions are selected from the coded original video stream using the coding parameters, and the whole amount of data is reduced. In particular, even when the data center processes object detection or object identification, a video stream to be processed can be confined.

Various alterations, corrections, and omissions to various embodiments of the present invention described above can be easily made by those skilled in the art without departing from the technical spirit and scope of the present invention. The above description is merely an example and is not intended to limit the present invention. The present invention is limited only as defined by the claims and equivalents thereof.

REFERENCE SIGNS LIST

1: Terminal
10: Original Video Stream Storage Unit
11: Coding Parameter Extraction Unit
12: Macroblock Selection Unit
13: Significant Video Stream Generation Unit
14: Video Stream Transmission Unit
15: Communication Interface
2: Data Center

The invention claimed is:

1. A non-transitory computer-readable recording medium storing a program, the program causing a computer to function as a device for generating a significant video stream from a captured and coded original video stream, the program causing the computer to perform:

extracting a coding parameter of each macroblock for each frame from the original video stream;

selecting the macroblock that has a coding parameter satisfying a predetermined condition, as a significant macroblock; and generating the significant video stream, in which a group of frames of the original video stream temporally synchronized with frames of coding parameters in significant macroblocks are combined in time series, wherein the coding parameter extracted from the macroblock and used for the predetermined condition includes an angle of a motion vector in a direction of a vanishing point with an associated temporal change.

2. The non-transitory computer-readable recording medium according to claim 1, wherein the program causes the computer to further perform generating a video stream in which the frames of the coding parameters are combined in time series, as the significant video stream, in addition to the video stream in which the frames of the original video stream temporally synchronized with the frames of the coding parameters are combined in time series.

3. The non-transitory computer-readable recording medium according to claim 1, wherein the program causes the computer to further perform generating the significant video stream which includes at least one of a frame number or a time code for each frame.

4. The non-transitory computer-readable recording medium according to claim 3, wherein the program causes the computer to further perform generating the significant video stream which includes significant macroblocks and distribution information of the significant macroblocks for each frame.

5. The non-transitory computer-readable recording medium according to claim 3, wherein the program causes the computer to further perform generating the significant video stream which includes a frame having a significant macroblock in a unit of group of pictures (GOP).

6. The non-transitory computer-readable recording medium according to claim 5, wherein the program causes the computer to further perform deleting a GOP not corresponding to a frame of a coding parameter in the significant macroblock or compressing the GOP not corresponding to the frame of the coding parameter in the significant macroblock at a compression rate equal to or higher than a predetermined rate.

7. The non-transitory computer-readable recording medium according to claim 1, wherein the original video stream is output from a camera mounted in a moving object, and the significant video stream includes video in which only an object appearing or disappearing among objects captured by the camera is imaged.

8. The non-transitory computer-readable recording medium according to claim 7, wherein the coding is performed based on Moving Picture Experts Group (MPEG) standard, and the coding parameter includes a magnitude and a direction of a motion vector of forward prediction (inter), an amount of coded data with intra prediction (intra), or a size of a quantization step.

9. The non-transitory computer-readable recording medium according to claim 8, wherein the program causes the computer to further perform selecting the significant macroblock where temporal variation is greater than a predetermined amount or more, and the satisfying the predetermined condition includes, for each of the macroblocks:

the motion vector of the forward prediction having the magnitude of a predetermined value or larger and having the angle or larger with respect to the direction of the vanishing point;

the amount of coded data with the intra prediction is equal to or greater than a first code amount; or the quantization step size is equal to or greater than a predetermined value.

10. The non-transitory computer-readable recording medium according to claim 9, wherein the program causes the computer to further perform determining that the moving object is not in motion for a frame that the amount of coded data with the intra prediction is equal to or greater than a second code amount, and excluding the frame from the significant video stream.

11. The non-transitory computer-readable recording medium according to claim 1, wherein the program causes the computer to further perform generating a coding parameter map in which the significant macroblocks are combined in a spatial direction corresponding to distribution information, and wherein, in the coding parameter map, as the coding parameter has a higher degree to satisfy the predetermined condition, a gradation of hue of a portion of the macroblock is displayed more darkly.

12. The non-transitory computer-readable recording medium according to claim 1, wherein the original video stream is coded, and the program causes the computer to further perform decompressing the original video stream in a simplified manner to extract the coding parameter of each macroblock for each frame.

13. A significant video stream generation device which generates a significant video stream from a captured and coded original video stream, the significant video stream generation device comprising:

a memory storing instructions; and one or more processors connected to the memory and configured to execute the instructions to perform processing of:

extracting a coding parameter of each macroblock for each frame from the original video stream;

selecting the macroblock that has a coding parameter satisfying a predetermined condition, as a significant macroblock; and generating the significant video stream, in which a group of frames of the original video stream temporally synchronized with frames of coding parameters in significant macroblocks are combined in time series, wherein the coding parameter extracted from the macroblock and used for the predetermined condition includes an angle of a motion vector in a direction of a vanishing point with an associated temporal change.

14. A method for generating a significant video stream from a captured and coded original video stream, the method comprising:

extracting a coding parameter of each macroblock for each frame from the original video stream;

selecting the macroblock that has a coding parameter satisfying a predetermined condition, as a significant macroblock; and generating the significant video stream, in which a group of frames of the original video stream temporally synchronized with frames of coding parameters in significant macroblocks are combined in time series, wherein the coding parameter extracted from the macroblock and used for the predetermined condition includes
an angle of a motion vector in a direction of a vanishing point with an associated temporal change.

15. The non-transitory computer-readable recording medium according to claim 1, the coding parameter extracted from the macroblock and used for the predetermined condition further includes:
an amount of coded data of an intra-predicted macroblock.

16. The significant video stream generation device according to claim 13, the coding parameter extracted from the macroblock and used for the predetermined condition further includes:
an amount of coded data of an intra-predicted macroblock.

17. The method for generating a significant video stream according to claim 14, the coding parameter extracted from the macroblock and used for the predetermined condition further includes:
an amount of coded data of an intra-predicted macroblock.

* * * * *